United States Patent [19]
White

[11] 3,759,096
[45] Sept. 18, 1973

[54] MEASURING THE VELOCITY OF A FLOWING FLUID
[75] Inventor: Douglas F. White, Bedminster, N.J.
[73] Assignee: American Standard Inc., New York, N.Y.
[22] Filed: Oct. 27, 1969
[21] Appl. No.: 869,709

[52] U.S. Cl. ............................................. 73/194 B
[51] Int. Cl. ............................................. G01f 1/00
[58] Field of Search ..................................... 73/194

[56] References Cited
OTHER PUBLICATIONS
Mair "The Effect of a Rear-Mounted Disc on the Drag of a Blunt-Based Body of Revolution", The Aeronautical Quarterly July 1965.

Primary Examiner—Herbert Goldstein
Attorney—Sheldon H. Parker, Tennes I. Erstad and Robert G. Crooks

[57] ABSTRACT

The velocity of a flowing fluid is determined by means of a device which includes an upstream cylindrical member and a downstream disc-like member spaced from the cylindrical member by a predetermined distance. Oscillations are produced in the fluid which passes around the cylindrical and disc structures and the frequency of the oscillations is measured. The cylindrical member when a streamlined nose is employed can have a diameter on the order of less than ½ inch by providing the cylindrical member with an annular discontinuity, such as a ring.

12 Claims, 4 Drawing Figures

Patented Sept. 18, 1973   3,759,096
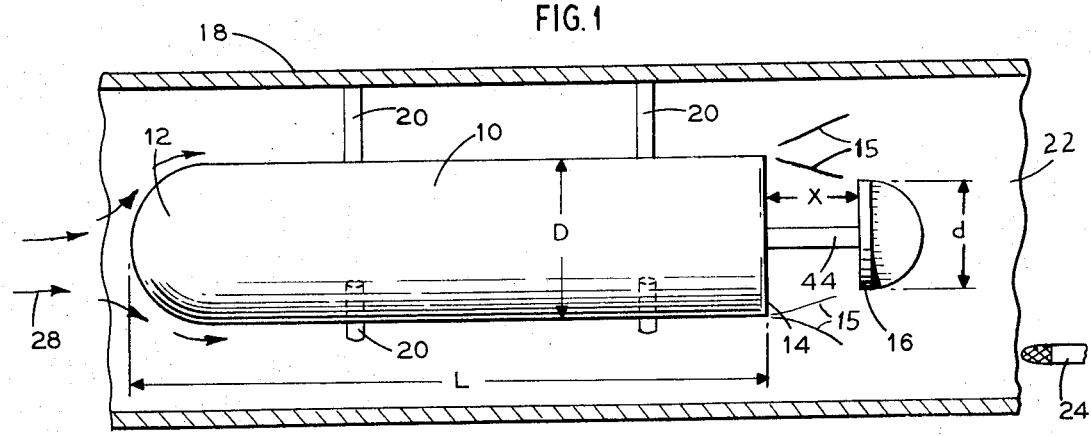
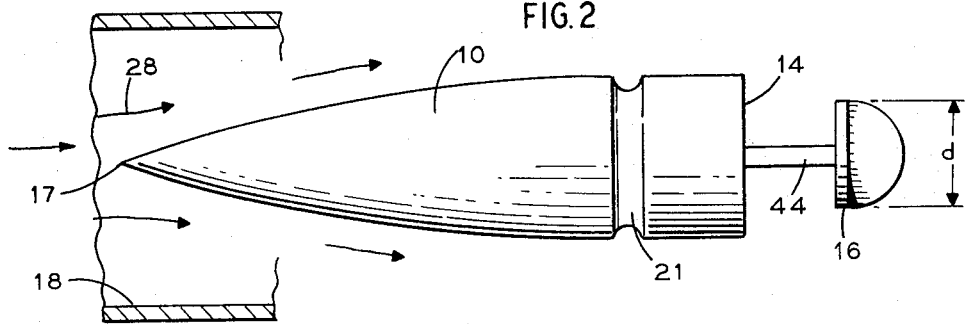
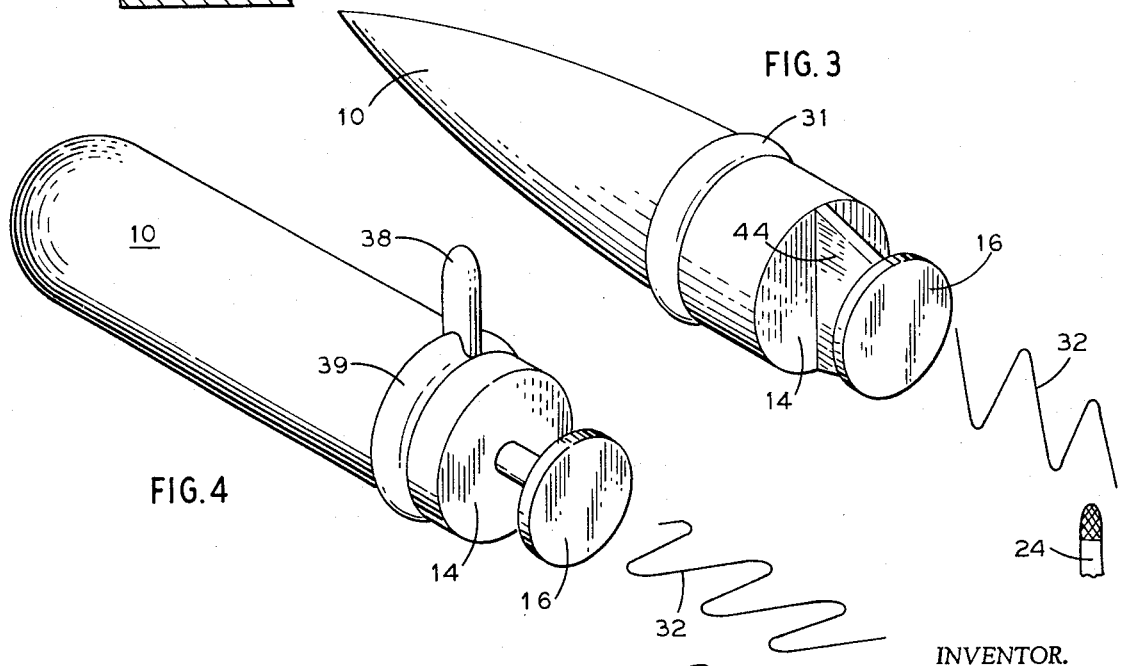
INVENTOR.
Douglas F. White
BY Sheldon H Parker
ATTORNEY

MEASURING THE VELOCITY OF A FLOWING FLUID

BACKGROUND OF THE INVENTION

1. Field of the Invention

This invention relates to fluid flow meters, more particularly to fluid flow meters which employ an obstruction in the path of the flowing fluid, in order to produce fluid fluctuations which are directly related to various parameters of the fluid, such as the fluid velocity.

2. Description of the Prior Art

It is known that the velocity of a flowing fluid can be determined by means of a cylindrical body having a curved nose at one end and a flat base at the other end which is connected to a disc of smaller diameter. The disc is centered coincident with the longitudinal axis of the body and is spaced axially from the base thereof.

This assembly, when aligned axially at midstream of a flowing fluid with the nose pointed upstream, generates a downstream wake in which the fluid traces an unsteady, irregular flow pattern, oscillatory in nature but with random, unpredictable variations and extinctions in the amplitude and frequency thereof.

Modification of the assembly by additional element of structure which splits or obstructs the fluid flow at or downstream from the space between the base and disc stabilizes the wake flow pattern into a fixed plane of strong oscillations the amplitude and frequency of which are readily measured. The frequency of the stabilized oscillations varies directly with the volumetric velocity of the fluid flow over a considerable range of velocities, whereby the modified assembly constitutes a simpler, linear, no-moving parts, digital-output flowmeter by which the fluid flow velocity can be readily measured with high precision.

However, in those cases where the cylinder diameter was on the order of ½ inch, instances were encountered in which the device appeared to either produce no oscillations or produced oscillations which were undetectable.

Not all attempts to use the foregoing device have met with success. For example, attempts have been made to employ the foregoing device in a fluid medium such as air, and in applications where a small diameter of the body portion of the device was required.

It has now been found that an apparatus of the type described can be modified so as to make it capable of generating strong stabilized oscillations in the downstream wake irrespective of the physical dimensions of the apparatus by an additional structural element which trips or obstructs the fluid flow stream along the surface of the cylindrical body, enables the apparatus to produce oscillations in the downstream wake which are easily and reproducibly measured for a given velocity of fluid flow. Moreover, the Strouhal number for the oscillatory flow has been found to be substantially constant over a considerable range of Reynolds numbers. Thus, in the oscillatory flow produced by the present invention, the frequency of oscillation is directly proportional to the fluid flow velocity over a substantial range of velocities and therefore the modified apparatus has excellent utility as a flowmeter which provides the advantages of simplicity, linearity, a digital output, no moving parts and very little pressure drop in the mean axial flow of the fluid moving by the relatively small obstruction that is constituted by the modified apparatus.

Furthermore, only a simple and inexpensive sensor is needed to detect the frequencies to thereby determine the flow velocity. As a matter of fact, relatively unsophisticated equipment consisting of a conventional microphone and electronic counter can be utilized to easily detect the strong signal issued by the stabilized oscillations that are produced by the apparatus of the invention. Accordingly, the invention provides both a unique form of apparatus and a method for determining the volumetric velocity of fluid flow with a high degreee of precision using a relatively simple and inexpensive system.

BRIEF DESCRIPTION OF THE DRAWINGS

Further details of the invention will be readily understood by reference to the accompanying drawings of which:

FIG. 1 is a side view, partly in section, of an apparatus which can be useful as a flowmeter when modified in accordance with the invention;

FIG. 2 is a side view of the apparatus in accordance with the invention;

FIG. 3 is a perspective view showing another modification of the apparatus of the invention; and FIG. 4 is a perspective view showing a further modification of the apparatus of the invention.

DESCRIPTION OF THE PREFERRED EMBODIMENTS

Referring now to FIG. 1, the apparatus illustrated therein includes a cylindrical body 10 having a curve nose 12 and a flat base 14 at its opposite end. Attached to the base 14 is a flat disc 16 of smaller diameter "$d$" as compared to the diameter "D" of the cylindrical body 10. The center of the disc is coincident with the longitudinal central axis of the body 10 and the disc is spaced axially from the base 14 by the distance "$x$".

The disc diameter $d$ is preferably from about 0.6 to about 0.8 times the member 10 diameter D. Distance X is preferably from about 0.28 to about 0.6 times the disc diameter $d$.

The body 10 and attached disc 16 are suspended at the center of a tube 18 by two sets of thin struts 20 connecting the exterior surface of the body 10 to the interior wall of the tube 18 (spaced 120° apart). As illustrated the struts are aligned in a plane passing through the central longitudinal axis of the body 10. The nose 12 faces a source of fluid flow and the disc 16 is pointed downstream facing the exit end 22 of the tube 18, with the longitudinal axis of the body 10 substantially parallel to the mean axial fluid flow within tube 18. Within the tube 18 is a sensor 24 the output of which is fed to a conventional analyzer and recorder (not shown) which analyzes and records the velocity or pressure changes detected by the sensor 24.

Referring now to FIG. 1 when a fluid such as air is flowed into the tube 18, the flow impinges upon the curved nose 12 of the body 10 and divides as shown by the arrows 28 to flow around and by the obstruction constituted by the body 10.

The boundary layer which forms at the nose 12, expands in a generally "V" shaped pattern as seen in FIG. 1. It is critical that the inwardly flowing portion 15 of the expanding boundary layer fluid interact, that is, be intersected by the disc 16.

While the theory behind the invention is not clearly defined, and should not be interpreted as being a limitation of the invention, an explanation of the probable reasons behind the invention is nevertheless believed to contribute to the understanding of the invention.

It appears that under some conditions the fluid flow along the surface of body 10 presists in a laminar condition after flowing some distance along the surface of the body 10. The laminar boundary layer, that is, the portion of the fluid flow adjacent to the surface of the body member 10, which is laminar, is relatively independent of the diameter of the body member 10.

If the boundary layer is not turbulent at the base 14, the change in fluid flow past the base 14 is such that the flow is not intersected by the disc 16. This is because a turbulent layer expands more rapidly than a laminar layer.

The use of a relatively sharp or pointed nose 17, as shown in FIG. 2 serves to decrease thickness of the boundary layer, but does not necessarily overcome the problems previously described with regard to the structure shown in FIG. 1. A thin boundary layer at the base is required to produce a steep velocity gradient at the base which produces the required low base pressure, $p_b$.

It is thus apparent that a critical relationship exists between the curvature of the nose portion of the cylindrical body member 10, the length "L", and the diameter "D" of the body member 10, as well as the ratio of the diameter of the body member to the diameter "d" of the disc 16, and the distance "x" between the base 14 of the cylindrical body member and the disc 16.

As shown in FIG. 2, a groove 21, which extends completely around the body 10, near the base 14, can be employed to interfere with the flow along the surface of the body member 10, thus insuring a turbulent boundary layer existing from the base.

As shown in FIG. 3, an annular member 31, can be employed in a manner similar to that of the groove 21.

The annular member 31, such as a wire serves to obstruct or trip the fluid flow and insures a turbulent boundary layer, virtually irrespective of the conditions which exist upstream of the annular member.

FIG. 4 illustrates a modification of the apparatus of FIG. 3 made in accordance with the invention. The modification consists of a small cylindrical rod or plug 38 positioned on the exterior surface of the body 10 adjacent to the flat base 14 thereof. The longitudinal axis of the rod 38 is coincident with a radius projected from the central longitudinal axis of the body 10. The rod 38 constitutes a further obstruction to the fluid flowing by exterior surface of the body 10 and in effect splits that flow before it reaches the space "x" between the base 14 and disc 16.

As a result of adding the rod 38, the oscillatory flow of the fluid in the downstream wake represented by trace 32 is stabilized in a fixed plane aligned perpendicularly to a plane coincident with the longitudinal axis of the rod. Therefore, the sensor 24 detects stabilized oscillations of large amplitude, also good quality, i.e., large signal to noise ratio. The frequency of the stabilized oscillations detected by the sensor is in direct correlation with the mean axial velocity of fluid flow within the tube 18 and therefore the velocity of the fluid flow may be readily measured with high precision within the range specified above.

While a cylindrical body member 10 having a diameter "D" of ½ inch and employing a ring 39, and a rod 38, can be made to produce the desired periodic flow perturbations, the use of the same structure, but without the ring on streamlined nose may not produce usable oscillations in a fluid medium such as air.

What is claimed is:

1. In a flowmeter for measuring the velocity of a fluid which includes a fluid oscillation generator composed of an obstruction member having a central longitudinal axis and a second member spaced by a predetermined distance from one end of said obstruction member so that an extension of said central longitudinal axis from said one end passes through said second member and measuring means for measuring the frequency of the fluid oscillations produced by said fluid oscillation generator, the improvement comprising, said obstruction member having an annular discontinuity along its periphery.

2. The structure of claim 1, wherein said discontinuity is a ring in contact with said obstruction member, said ring having an outermost diameter greater than the diameter of said obstruction member at the place of contact.

3. The structure of claim 1, wherein said discontinuity is a groove, said groove being in a plane perpendicular to the longitudinal axis of said obstruction member.

4. The structure of claim 1, wherein said obstruction member is relatively pointed at its second end and has a relatively flat base at its said one end.

5. The structure of claim 1, further comprising stabilizer means adjoining said fluid oscillation generator for stabilizing the fluid oscillations in a plane which remains substantially fixed in angular position relative to said longitudinal axis.

6. A flowmeter as in claim 1 wherein said obstruction member is cylindrical and has a pointed nose at its second end and a flat base at its one end, and said second member is a disc having a smaller diameter than the diameter of said body, and said disc is positioned perpendicularly to and with its center coincident with said projected central longitudinal axis.

7. A flowmeter as in claim 6 wherein the ratio of the diameter of said disc to the diameter of said obstruction member has a value within the range from about 0.6 to about 0.8, and the ratio of said predetermined distance to the diameter of said obstruction member has a value within the range from about 0.28 to about 0.6.

8. A flowmeter as in claim 1 which further includes a hollow cylindrical conductor for said flowing fluid, said flowmeter being suspended at midstream of said flowing fluid within said hollow cylindrical conductor.

9. A flowmeter comprising an obstruction member having a central longitudinal axis and a planar member spaced by a predetermined distance from one end of said obstruction member so that an extension of said central longitudinal axis from said one end passes through said planar member, and is substantially perpendicular to said planar member, said obstruction member having an annular discontinuity along its periphery, and means for measuring the frequency of fluid oscillations produced by said obstruction member.

10. A flowmeter related to and comprising an obstruction member having a longitudinal axis, a second member spaced by a predetermined distance from one end of said obstruction member so that an extension of said central longitudinal axis from said one end passes through said second member, said second member having a diameter perpendicular to said extended central longitudinal axis less than a parallel diameter of said obstruction member at said one end, stabilizer means associated with said fluid oscillation generator for stabilizing the orientation of said fluid oscillations in a fixed angular position relative to said longitudinal axis, measuring means for measuring the frequency of the stabilized fluid oscillations and a peripheral discontinuity along the surface of said obstruction member, said peripheral discontinuity being proximate said one end of said obstruction member and lying in a plane which is substantially perpendicular to said central longitudinal axis of said obstruction member.

11. In a fluid flowmeter device for measuring a parameter of a flowing fluid, which device includes a fluid oscillation generator composed of an elongated obstruction member having a longitudinal axis and a second member spaced by a predetermined distance from one end of said obstruction member so that said longitudinal axis passes through said second member, a stabilizer means for stabilizing fluid oscillations generated by said flowmeter so that the oscillations occur in a predetermined plane, and measuring means for measuring the frequency of the stabilized fluid oscillations the improvement comprising a circumferentially extending discontinuity along the surface of said obstruction member, said discontinuity being proximate said one end of said obstruction member.

12. In a device for generating fluid oscillations in a flowing fluid, said device having an upstream elongated member, a downstream planar member the plane of said planar member being relatively perpendicular to the longitudinal axis of said elongated member, and stabilizer means associated with said device whereby said fluid oscillations remain substantially fixed with respect to their angular relationship to said longitudinal axis, and measuring means for measuring the frequency of said fluid oscillations, the improvement comprising a circumferentially extending turbulence promoter adjoining said upstream elongated member proximate its downstream end.

* * * * *